| United States Patent [19] | [11] | 4,414,119 |
|---|---|---|
| Duke, Jr. | [45] | Nov. 8, 1983 |

[54] INJECTIVITY OF CRUDE OIL AND PETROLEUM SULFONATE SLUGS BY THE ADDITION OF AN ALKYLBENZENE SULFONATE

[75] Inventor: Roy B. Duke, Jr., Littleton, Colo.

[73] Assignee: Marathon Oil Company, Findlay, Ohio

[21] Appl. No.: 336,731

[22] Filed: Jan. 4, 1982

[51] Int. Cl.$^3$ .............................................. E21B 43/22
[52] U.S. Cl. .................................. 252/8.55 D; 166/275
[58] Field of Search .............. 252/8.55 D, 8.3, 8.55 B; 166/274, 275

[56] References Cited

U.S. PATENT DOCUMENTS

| 3,307,628 | 3/1967 | Sena ..................................... 166/169 |
| 3,437,140 | 4/1969 | Foster et al. ......................... 166/273 |
| 3,506,070 | 4/1970 | Jones .................................... 166/273 |
| 3,506,071 | 4/1970 | Jones .................................... 166/273 |
| 3,512,586 | 5/1970 | Holm .................................... 166/273 |
| 3,924,681 | 12/1975 | Clark et al. ...................... 252/8.55 X |
| 3,933,201 | 1/1976 | Kerfoot et al. ...................... 166/273 |
| 3,938,591 | 2/1976 | Ossip et al. ........................... 166/273 |
| 3,951,828 | 4/1976 | Plummer ........................ 252/8.55 X |
| 3,964,548 | 6/1976 | Schroeder et al. ................. 166/273 |
| 3,997,451 | 12/1976 | Plummer et al. ................... 166/273 |
| 4,013,125 | 3/1977 | Plummer et al. ................... 166/273 |
| 4,147,638 | 4/1979 | Plummer ....................... 252/8.55 D |
| 4,148,821 | 4/1979 | Nussbaum et al. ............ 252/8.55 X |

FOREIGN PATENT DOCUMENTS

| 971186 | 7/1975 | Canada ............................... 252/8.55 |
| 53-130201 | 11/1978 | Japan .................................. 252/8.55 |

OTHER PUBLICATIONS

"Possibility of Using Micellar Solutions Based on Alkylbenzenesulfonates For Increasing Petroleum Extraction" N. B. Uzdennikov–51–Fossil Fuels, vol. 87, 1977–p. 125.

Primary Examiner—Herbert B. Guynn
Attorney, Agent, or Firm—Jack L. Hummel

[57] ABSTRACT

Alkylbenzene sulfonate is added to a crude oil sulfonation product to prevent the formation of insoluble precipitates in the crude oil sulfonation product. The use of an alkylbenzene sulfonate as an additive to a microemulsion slug containing crude oil sulfonation product improves the injectivity of the microemulsion slug and prevents substantial plugging of the fluid injection system and the subterranean oil-bearing formation by insoluble precipitates in the microemulsion.

5 Claims, No Drawings

INJECTIVITY OF CRUDE OIL AND PETROLEUM SULFONATE SLUGS BY THE ADDITION OF AN ALKYLBENZENE SULFONATE

DESCRIPTION

1. Technical Field

The invention relates to a process for improving the injectivity of a microemulsion into a permeable subterranean formation to recover oil therefrom by inhibiting the formation of insoluble precipitates in the microemulsion.

2. Background Art

Crude oil sulfonates are often used as surfactants in microemulsions injected into subterranean, oil-bearing formations for enhanced oil recovery. However, when crude oil is sulfonated to produce the crude oil sulfonate, substantial amounts of unreacted hydrocarbons and certain sulfonation byproducts of limited solubility sometimes remain in the sulfonation product phase. Insoluble hydrocarbons may include waxes and asphaltenes; insoluble byproducts may include sulfones.

Precipitates often form after salts of the sulfonation product are diluted with water. The presence of these insoluble precipitates limits the injectivity of a microemulsion slug containing the crude oil sulfonate. When precipitates are present in the slug at the time of injection, injection of the slug into the formation becomes more difficult and sometimes impossible. Precipitates which form in the microemulsion slug after injection of the slug into the subterranean formation cause plugging of the formation, thereby limiting the amount of microemulsion which may be injected in the formation.

Several prior art processes exist to minimize the amount of precipitate present in the microemulsion slug. One process extracts the precipitate precursors with alkylate or kerosene from the crude oil sulfonation product before precipitation occurs. A second process removes the precipitate from the sulfonation product after it has formed by filtration through a diatomaceous earth medium. This is often done immediately prior to injection of the microemulsion ring into the subterranean formation. A third process injects the microemulsion slug into the formation immediately after the crude oil sulfonate is produced but before the precipitate forms. However, none of these processes inhibits precipitate formation caused by unremoved precipitate precursors after the microemulsion is injected into the subterranean formation.

The prior art teaches many processes in which compositions containing sulfonates are injected into subterranean formations to enhance the recovery of oil therefrom. U.S. Pat. No. 3,933,201 to Kerfoot et al teaches the injection of overbased alkylated sulfonates into a subterranean formation as an anionic waterflood additive. The aqueous alkylated sulfonate slug is injected into the formation followed by an aqueous basic component slug to overbase the sulfonate in the prior slug or alternatively the alkylated sulfonate is overbased at the surface and then the basic alkylated sulfonate mixture is injected into the subterranean formation. U.S. Pat. No. 3,512,586 to Holm teaches the injection of a water-in-oil type microemulsion into a subterranean formation.

A surfactant is one component of the microemulsion; the surfactant contains both oil soluble alkylaryl sulfonates and water soluble alkylaryl sulfonates made from a mixture of hydrocarbons or an appropriate alkylaryl hydrocarbon. After injection of the microemulsion, water is injected to drive the resulting oil and microemulsion from the formation to the surface through a production well.

U.S. Pat. No. 3,437,140 to Foster et al teaches a method to increase surfactant utilization where a surfactant is injected into a subterranean, oil-bearing formation. A slug of saline surfactant solution, which contains both high and low molecular weight surfactant, such as mixtures of alkylaryl sulfonates, is injected into the formation followed by a second slug of less saline surfactant solution which has only a low molecular weight surfactant. Then the formation is water flooded to produce oil. "Possible Use of Micellar Solutions Based On Alkylbenzene Sulfonates To Increase Oil Recovery," N. P. Uzdennikov et al, Neftepromuislovoe Delo, No. 9, 1977, teaches the use of sodium alkylbenzene sulfonates in microemulsions to impart high surface activity to the microemulsion and reduce the surface tension at the oil and water interface in the microemulsion. The resulting microemulsion is for use in enhanced oil recovery processes. U.S. Pat. No. 4,147,638 to Plummer teaches the introduction of alkylbenzene into a reactor wherein a crude oil feedstock is being sulfonated to improve the solubility of the reactants within the reactor. The alkylbenzene is either incorporated into the feedstock entering the reactor or added to the reactor once the sulfonation reaction has commenced. The added alkylbenzene often becomes sulfonated along with the reactants and becomes a component of the product mixture.

The prior art processes provide for the injection of fluids which contain an alkylaryl sulfonate into a subterranean, oil-bearing formation to improve the recovery of the oil within the formation. However, the alkylaryl sulfonate as used in the prior art processes does not act to prevent formation of precipitates in the injection fluids either prior to injection or in the subterranean formation subsequent to injection.

Thus a need exist for a process to prevent the formation of insoluble precipitates in a microemulsion slug containing a crude oil sulfonate and thereby improve the injectivity of the slug where the slug is to be injected into a subterranean, oil-bearing formation.

DISCLOSURE OF INVENTION

Formation of insoluble precipitates in a crude oil sulfonate is substantially prevented by the addition of an alkylbenzene sulfonate to the crude oil sulfonate. When the alkylbenzene sulfonate is admixed with the crude oil sulfonate, solid precipitates are not observed to form in the mixture. The alkylbenzene sulfonate may be added to a microemulsion slug containing the crude oil sulfonate to prevent substantial plugging of the fluid injection system or the subterranean, oil-bearing formation by insoluble precipitates.

BEST MODE FOR CARRYING OUT THE INVENTION

The present invention relates to a process for substantially preventing formation of insoluble precipitates in a crude oil sulfonate when the crude oil sulfonate is a component of a microemulsion slug to be injected into a subterranean, oil-bearing formation. The process of the present invention comprises the addition of an alkylbenzene sulfonate to the crude oil sulfonate at some stage prior to injection of the microemulsion slug into the subterranean formation.

The alkylbenzene sulfonate used in accordance with the present invention is comprised of a single aryl group, at least one alkyl group (but no more than two alkyl groups) attached to the aryl group, and a single sulfonate group attached to the aryl group. The length of the alkyl group, or alkyl groups, is in the range of from about 10 to about 20 carbon atoms per alkyl group.

The general formula of the alkylbenzene sulfonate used in the present invention is:

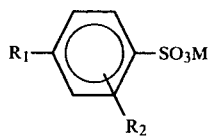

wherein $R_1$ is an alkyl group, $R_2$ is either hydrogen or an alkyl group and M is a monovalent cation.

The alkyl groups, $R_1$ and $R_2$, may be either linear or branched and are comprised of from about 10 to about 20 carbon atoms. The monovalent cation, M, is selected to be compatible with the microemulsion of which the alkylbenzene sulfonate is to become a component. As such, M is either an ammonium ion, an alkyl ammonium ion, an aryl ammonium ion, or a metallic ion group IA of the Periodic Table of Elements, such as sodium or potassium.

The alkylbenzene sulfonate of the structure described above is prepared in a manner known to one of ordinary skill in the art. First, alkylbenzene sulfonate precursors are prepared by alkylating benzene with $C_{10}$ to $C_{20}$ olefins or alkyl halides using a Friedel-Crafts type catalyst. Pure olefins or alkyl halides are not required as reactants; mixtures of $C_{10}$ to $C_{20}$ olefins are preferred. The ratio of monoalkylbenzene to dialkylbenzene may be controlled by the olefin to benzene ratio, the reaction time and the reaction temperature. However, it is unnecessary to specify a particular ratio of monoalkylbenzene to dialkylbenzene for use as alkylbenzene sulfonate precursors in the present invention. Once the precursors are prepared, they are sulfonated and then converted to their ammonium or metallic salt resulting in the final product, an alkylbenzene sulfonate.

Both mono- and dialkylbenzene sulfonates work equally well in preventing insoluble precipitate formation in crude oil sulfonates. Regardless of the species of alkylbenzene which is present, it is necessary that each alkyl group be comprised of from about 10 to about 20 carbon atoms. The specified range of from about 10 to about 20 carbon atoms for each alkyl group is required because within this specified range the alkylbenzene sulfonates exhibit both hydrophilic and hydrophobic properties to the extent necessary to allow solubility of the alkylbenzene sulfonate in a microemulsion containing a crude oil sulfonate and to simultaneously prevent formation of the insoluble precipitates. Alkylbenzene sulfonates containing either one or two alkyl groups of less than about 10 carbon atoms per alkyl group are too hydrophilic to prevent formation of the insoluble hydrocarbon precipitate in the microemulsion and are thus unsuitable for the practice of the present invention. Alkylbenzene sulfonates containing either one or two alkyl groups of more than about 20 carbon atoms per alkyl group are too hydrophobic to allow solubility of the alkylbenzene sulfonate in the microemulsion and are likewise unsuitable for use in the present invention.

Having obtained an alkylbenzene sulfonate of the above stated structure, the alkylbenzene sulfonate is mixed with a crude oil sulfonation product in an amount so that from about 1 percent to about 40 percent by weight of the sulfonate groups in the mixture is attributable to the alkylbenzene sulfonate component of the mixture and the remaining percent by weight of the sulfonate groups is attributable to the crude oil sulfonation product. A more preferred weight percent range of sulfonate groups in the mixture attributable to the alkylbenzene sulfonate is from about 2 percent to about 20 percent by weight; the remainder is attributable to the crude oil sulfonation product. A most preferred range is from about 5 percent to about 10 percent by weight of the sulfonate groups attributable to the alkylbenzene sulfonate; the remainder is attributable to the crude oil sulfonation product.

The resulting mixture of the alkylbenzene sulfonate and crude oil sulfonation product is but one component of a microemulsion slug. The other components may include hydrocarbon, water, electrolyte which is preferably soluble in the water, and cosurfactant. The preparation of the microemulsion is within the purview of the skilled artisan. Patents teaching the preparation of microemulsions for enhanced oil recovery are numerous in the prior art. The following U.S. patents are examples of such art: U.S. Pat. No. 3,307,628 to Sena; U.S. Pat. No. 3,506,071 and U.S. Pat. No. 3,506,070 to Jones; U.S. Pat. No. 3,997,451 and U.S. Pat. No. 4,013,125 to Plummer et al; U.S. Pat. No. 3,938,591 to Ossip et al; and U.S. Pat. No. 3,964,548 to Schroeder et al. The above-cited patents are hereby incorporated by reference into the present invention.

In accordance with the present invention, the process of mixing the alkylbenzene sulfonate and crude oil sulfonation product may be undertaken at any stage in relation to the overall process of formulating a microemulsion containing the alkylbenzene sulfonate and crude oil sulfonation product and injection of the microemulsion into a subterranean, oil-bearing formation. Three variations of the process are given as follows: First, the alkylbenzene may be mixed with a crude oil. This mixture then undergoes a sulfonation reaction to simultaneously sulfonate the crude oil and alkylbenzene in a reactor and is then neutralized with a base to produce the product mixture of the alkylbenzene sulfonate and crude oil sulfonate. The product mixture is stable and is a suitable component of a microemulsion to be injected into a subterranean formation without substantial precipitation of insoluble hydrocarbons.

Alternatively the alkylbenzene sulfonate may be produced separately from the crude oil sulfonate. While the microemulsion is being formulated, the crude oil sulfonation product and alkylbenzene sulfonate are added at which time the alkylbenzene sulfonate becomes mixed and uniformly dispersed within the crude oil sulfonation product to substantially prevent the formation of insoluble hydrocarbon precipitates in the microemulsion.

Finally the microemulsion may be prepared with all its components including the crude oil sulfonation product, but excluding only the alkylbenzene sulfonate. Immediately prior to injection of the microemulsion into a subterranean, oil-bearing formation the microemulsion slug is filtered through diatomaceous earth to remove any insoluble precipitates attributable to the crude oil sulfonation product present in the microemulsion slug. The alkylbenzene sulfonate is then added to the microemulsion slug subsequent to formulation of the slug and filtration but still prior to injection of the microemulsion slug into the formation. The alkylbenzene sulfonate is mixed and uniformly dispersed within the crude oil sulfonation product contained in the microemulsion to substantially prevent further precipitation of the insoluble precipitate.

Although all three variations of the above described process are within the scope of the present invention, addition of the alkylbenzene sulfonate to the microemulsion after formulation and filtration of the microemulsion but prior to injection of the microemulsion into the formation is the preferred method of the present invention.

The following example is illustrative of the application of the process of the present invention and is not to be construed as limiting the scope thereof.

EXAMPLE 1

A microemulsion slug is formulated using a crude oil sulfonate, of which 2.5 percent by weight of the slug is made up of —$SO_3NH_4$ groups on the sulfonate molecule and 1.5 milliliters of n-amyl alcohol per hundred grams of slug. The slug is filtered through a diatomaceous earth medium. The injectivity of the slug is determined by an analytical filtration test. Analysis of the filtration curve based on filtering through a 0.80 micron filter at 65° F. and 30 psig, shows that the slug follows the Standard Law of Filtration. See J. Hermia, Revue Universelle Mines, 109(2), 45–51 (1966). As a result the slug is classified as uninjectable. An identical slug is formulated and blended with a dodecylbenzene sulfonate with an average molecular weight of 312 manufactured by Continental Oil Company, Petrochemical Department, Saddle Brook, N.J. so that the final mixture contains 2.25 percent by weight of ammonium sulfonate groups attributable to the crude oil sulfonate and 0.25 percent by weight ammonium sulfonate groups attributable to the alkylbenzene sulfonate. The slug is then filtered through a diatomaceous earth bed. Analysis of the filtration curve for this slug, based on filtering through a 0.80 micron filter at 65° F. and 30 psig shows that the slug follows the Cake Law of Filtration. See J. Hermia, ibid. As a result the slug is classified as injectable after the addition of the alkylbenzene sulfonate.

While the foregoing preferred embodiment of the invention has been described and shown, it is understood that all alternatives and modifications, such as those suggested, and others may be made thereto, and fall within the scope of the invention.

What is claimed is:

1. A process for inhibiting the formation of insoluble precipitates in a crude oil sulfonation product wherein said crude oil sulfonation product is a component of a microemulsion that is to be injected into a subterranean, oil-bearing formation to recover oil therefrom, the process comprising the steps of:
   (a) mixing said crude oil sulfonation product, a hydrocarbon, water, and a cosurfactant to form said microemulsion;
   (b) filtering said microemulsion through a diatomaceous earth filter medium; and thereafter
   (c) adding an alkylbenzene sulfonate to said microemulsion at a concentration such that about 1 to about 40 weight percent of the resulting sulfonate groups in said microemulsion is attributable to said alkylbenzene sulfonate and the remaining weight percent of said sulfonate groups is attributable to said crude oil sulfonation product, and wherein said alkylbenzene sulfonate is defined by the formula:

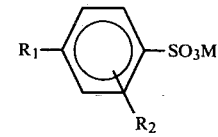

wherein $R_1$ and $R_2$ are alkyl groups containing about 10 to about 20 carbon atoms each and M is a monovalent cation; and
   (d) blending said microemulsion for a time sufficient to obtain uniform dispersion of said alkylbenzene sulfonate in said microemulsion, which substantially inhibits the formation of the insoluble precipitates therein.

2. The process of claim 1 wherein about 2 to about 20 weight percent of the resulting sulfonate groups is attributable to said alkylbenzene sulfonate.

3. The process of claim 1 wherein about 5 to about 10 weight percent of the resulting sulfonate groups in said microemulsion is attributable to said alkylbenzene sulfonate.

4. The process of claims 1, 2 or 3 wherein said monovalent cation is an ammonium ion, an alkyl ammonium ion, an aryl ammonium ion, or a metallic ion from group IA of the Periodic Table of the Elements.

5. The process of claims 1, 2 or 3 wherein said $R_1$ and $R_2$ groups are alkyl groups containing about 12 to about 16 carbon atoms.

* * * * *

UNITED STATES PATENT AND TRADEMARK OFFICE
CERTIFICATE OF CORRECTION

PATENT NO. : 4,414,119
DATED : November 8, 1983
INVENTOR(S) : Roy B. Duke, Jr.

It is certified that error appears in the above-identified patent and that said Letters Patent are hereby corrected as shown below:

Col. 1, line 42: Delete "ring" and insert --slug--.
Col. 2, line 8: Delete "surfactant" and insert --surfactants--.
Col. 2, line 39: Delete "exist" and insert --exists--.
Col. 3, line 25: After metallic ion, insert --from--.

Signed and Sealed this

Eighteenth Day of September 1984

[SEAL]

Attest:

GERALD J. MOSSINGHOFF

Attesting Officer    Commissioner of Patents and Trademarks